3,106,407
Patented Oct. 8, 1963

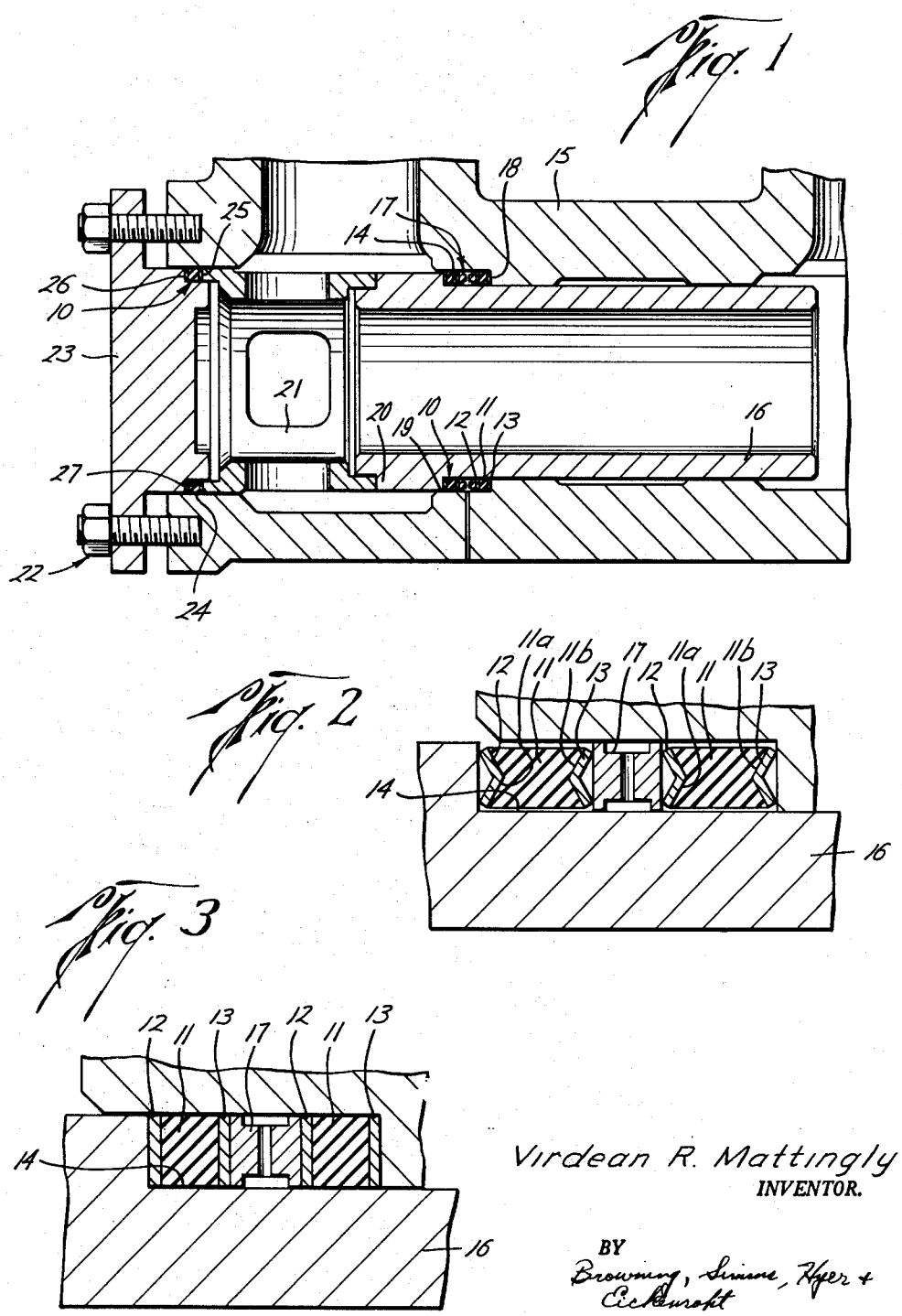
Oct. 8, 1963    V. R. MATTINGLY    3,106,407
PACKING RING WITH ANTI-EXTRUSION END RINGS
Filed May 2, 1961
Virdean R. Mattingly
INVENTOR.
BY
Browning, Simons, Hyer &
Eckersoht
ATTORNEYS

United States Patent Office

3,106,407
PACKING RING WITH ANTI-EXTRUSION END RINGS
Virdean R. Mattingly, P.O. Box 9255, Houston, Tex.
Filed May 2, 1961, Ser. No. 107,196
4 Claims. (Cl. 277—188)

This invention relates to packings. More particularly, it relates to improvements in packings of the type having anti-extrusion elements at their ends.

It is common practice to provide packings with relatively hard anti-extrusion elements at their ends for the purpose of preventing extrusion of the relatively soft sealing material of the packings into the cracks or spaces between the adjacent structural elements when the packings are exposed to high pressures. In order to accomplish this purpose, the anti-extrusion end elements must be adapted to engage tightly the inner and outer sealing surfaces of the adjacent structural elements at each end of the sealing material when the packings are mounted in operative position and must be capable of maintaining this close fit under a wide range of operating conditions.

Because of this requirement, many types of composite packings are considered unsuitable for use in many important applications. For example, the liners and counterbores of slush pumps which generally provide the inner and outer sealing surfaces, respectively, for the liner packing frequently vary in size, particularly in reconditioned pumps. Because of this variation in size of the packing receiving space, composite packings of the type having unitary anti-extrusion end elements are considered unsuitable for use as liner seals since it is not practical to provide the packings in a sufficient range of sizes to avoid leaving gaps or spaces between the anti-extrusion end elements of the packing and the inner and outer sealing surfaces on the pump when the packing is mounted in operative position.

An object of this invention is to provide an improved composite packing which obviates the foregoing difficulties and disadvantages.

Another object of the invention is to provide an improved composite packing of the type having unitary anti-extrusion end elements which can be used satisfactorily in applications wherein the packing receiving space may vary in size.

Another object of the invention is to provide an improved composite packing having unitary anti-extrusion end rings of relatively hard material which are adapted to be forced into the corners of the packing receiving space to act as dams for preventing extrusion of the intermediate sealing material when the packing is exposed to high pressures.

Another object of the invention is to provide an improved composite packing of the type having relatively hard anti-extrusion rings of unitary construction at its ends and relatively soft sealing material intermediate its ends in which said anti-extrusion end rings are shaped and proportioned so as to be capable of simultaneously expanding and contracting in a radial direction into a tight fit with the adjacent structural surfaces upon application of an endwise force to the composite packing.

Another object of the invention is to provide an improved composite packing suitable for use as a liner seal or a cylinder head seal on a slush pump.

Other objects, advantages and features are inherent and will become apparent upon consideration of the specification, claims and attached drawings.

These and other objects and advantages are accomplished according to this invention by a composite packing having an annular mass of a relatively soft sealing material intermediate its ends and a relatively hard anti-extrusion ring of unitary construction positioned at each of its ends. Each of said anti-extrusion rings comprises a relatively thin sheet-like ring shaped and proportioned in such a manner that application of an endwise force to the composite packing causes the inner and outer edges of each end ring to be forced radially inwardly and outwardly, respectively, into a tight, or at least a very close, fit with the adjacent structural surfaces, thereby preventing extrusion of the intermediate sealing material when the packing is exposed to high pressures. More particularly, each of the anti-extrusion end rings is constructed so that the length of the projection of two opposed points on its radially inner and outer edges, when projected parallel to the axis of the ring onto a line drawn perpendicular to the ring's axis, is less than the distance between these same points when measured along a line drawn on the surfaces of the end faces of the ring. Thus, the anti-extrusion end rings of this invention may have a V-shape, U-shape, W-shape, dome-shape, or the like, the primary requirement being that these portions of the ring body should contain sufficient material so that when the rings are flattened out during loading of the packing assembly, the inner and outer edges of each ring will be moved radially inwardly and outwardly into a tight, or at least a very close, fit with the inner and outer sealing surfaces on the adjacent structural elements, thereby providing anti-extrusion dams at each end of the intermediate mass of sealing material.

Various forms of the invention with which the foregoing objects can be accomplished are illustrated in the attached drawings. In the drawings, wherein like characters are used to designate like parts throughout the several views:

FIG. 1 is a cross sectional view of a set of composite packings constructed according to this invention and mounted in operative position on the liner and cylinder head of a slush pump;

FIG. 2 is an enlarged cross sectional view of the liner packings of FIG. 1 showing the position of parts before the liner has been tightened down to apply an endwise force to the packings;

FIG. 3 is a cross sectional view similar to FIG. 2 but showing the position of parts after the liner has been tightened down to apply the endwise force to the packings; and Referring now to FIGS. 1 through 3 of the drawings and the embodiment of the invention illustrated therein, the composite packing 10 of this invention will be seen to include an annular mass 11 of relatively soft sealing material such as rubber, synthetic rubber, or the like, having relatively thin sheet-like anti-extrusion rings 12 and 13 mounted at its ends. End rings 12 and 13 preferably are made of relatively hard material such as nylon, Teflon, lead, steel, or the like, and are V-shaped in axial cross section, the apexes of the rings being disposed toward the intermediate mass of sealing material and received in corresponding V-shaped grooves 11a and 11b, respectively, formed in the end faces of the sealing material. The anti-extrusion end rings may be integrally joined with and formed on the same initial radial dimensions as the intermediate mass of sealing material, all being dimensioned for a loose fit within the packing receiving space. As will be seen, application of an endwise force to the composite packing 10 during loading of the assembly causes the V-shaped anti-extrusion end rings 12 and 13 to be flattened and moved radially inwardly and outwardly into a tight, or at least a very close, fit with the structural surfaces adjacent to the packing, thereby providing anti-extrusion dams at each end of sealing material 11. At the same time, the relatively soft mass of sealing material confined between the end rings will be deformed radially inwardly and outwardly into sealing engagement with the sealing surfaces on the adjacent structural surfaces.

The operation of the composite packing of this invention will be described in connection with its use as a liner seal for a slush pump. However, it will be understood that it has utility in other applications, particularly in cases in which the packing receiving space varies in size. It is of special value in severe or rugged uses, such as in slush pumps, where the packing is subjected to pulsations due to the drag of the piston against the liner and the action of the high pump pressures working against the liner and cylinder cap. In such severe usages, other packing has presented the problem of being extruded from the packing receiving space during periods of prolonged usage, but the composite packings of this invention have stood up very well. The anti-extrusion rings serve their purpose of holding the softer sealing material in place even in the rigorous conditions prevailing in the slush pump.

In accordance with conventional practice, a pair of composite packings 10 constructed according to this invention may be mounted in a recess 14 formed between fluid cylinder 15 and liner 16, the liner packings being separated by a lantern ring 17 and the lower one of the packings being engaged by the shoulder 18 formed in the bottom of liner packing counterbore 19 and the upper one of the packings being engaged by liner collar 20. Liner 16 is held in operative position by liner hold-down ring 21 and is moved axially of fluid cylinder 15 to apply endwise forces on liner packings 10 by tightening studs 22 against cylinder head 23.

Another composite packing 10 may be mounted in recess 24, formed between cylinder head 23 and fluid cylinder 15, the lower end of the packing being engaged by the upwardly facing shoulder 25 formed at the upper end of liner hold-down ring 21 and the upper end of the packing being engaged by the downwardly facing shoulder 26 formed in the upper end of cylinder head packing bore 27. As will be understood, this cylinder head packing also will be subject to an endwise force and will operate in the same manner as the liner packings when studs 22 are tightened against cylinder head 23 to move liner 16 axially of fluid cylinder 15.

It will be recalled that liner 16 and liner packing counterbore 19 frequently vary in size, particularly in reconditioned pumps. As a result of these size variations, there may be relatively large clearance between the anti-extrusion end rings of the packings and the inner and outer sealing surfaces on the liner and pump body. This situation is illustrated in FIG. 2 which shows the liner packings in their operative positions but before the liner has been tightened down to subject them to an endwise force. In the case of presently known packings of the type having unitary anti-extrusion end elements, the intermediate sealing material would extrude through these gaps or spaces after the liner is tightened down and the packings are exposed to high pressures.

However, due to the unique construction of the composite packings of this invention, the unitary anti-extrusion end rings of the packings are capable, upon application of an endwise force, of being flattened out and forced radially inwardly and outwardly into a tight fit with the liner and pump body at each end of the sealing material, thereby bridging these gaps or spaces and confining the sealing material against extrusion. This action is illustrated in FIG. 3 which shows the positions taken by the packing elements when an endwise force or load has been applied thereto by tightening down the liner. As will be understood, the relatively soft sealing material 11 will be deformed radially inwardly and radially outwardly into sealing engagement with the liner and pump body, respectively, at the same time that the relatively hard anti-extrusion end elements are being moved radially inwardly and outwardly by the application of the endwise force.

It will be understood that in some applications the anti-extrusion end rings preferably should have sufficient resiliency to relieve them from tight engagement with the walls of the packing receiving space when the endwise force on the packing assembly is released so as to facilitate removal of the packing on disassembly. This resiliency of the end rings is particularly desirable when they are made of relatively tough, hard materials such as steel and the like.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A composite packing comprising an annular body of rubber-like sealing material; and an anti-extrusion element of relatively hard material closely abutting each end of said body, each of said anti-extrusion elements comprising a relatively thin, imperforate, one-piece, sheet-like ring having inner and outer peripheral edge surfaces, said ring being formed with the shortest straight line distance between its inner and outer peripheral edge surfaces measured along a line extending radially from the center line of the ring less than the shortest distance between its inner and outer peripheral edge surfaces measured along the surface of the ring itself, the elements being positioned abutting each end of the body with the greatest longitudinal distance between the outer peripheral edge surfaces of the elements and the greatest longitudinal distance between the inner peripheral edge surfaces of the elements being approximately equal and constituting the maximum longitudinal dimension of the composite packing and each element having an annular portion intermediate its inner and outer peripheral edge surfaces offset toward the body.

2. The packing of claim 1 in which the anti-extrusion elements are V shaped in cross section and are formed of nylon.

3. A pressure-tight joint between two members, the members having spaced, parallel, cylindrical surfaces, two spaced annular shoulders located between the cylindrical surfaces, each shoulder being movable longitudinally relative to at least one of the cylindrical surfaces, the opposing walls of the shoulders being flat, parallel and perpendicular to the cylindrical surfaces, the surfaces and the opposing walls defining an annular space; a packing element in the annular space comprising an annular body of rubber-like sealing material, and an anti-extrusion element of relatively hard material abutting each end of the body, each of the anti-extrusion elements comprising a relatively thin, imperforate, one-piece, sheet-like annular member having inner and outer peripheral edge surfaces, said member being formed with the shortest straight line distance between its inner and outer peripheral edge surfaces measured along a line extending radially from the center line of the annular member less than the shortest distance between its inner and outer peripheral edge surfaces when measured along the surface of the member itself, the elements being positioned abutting each end of the body with the greatest longitudinal distance between the outer peripheral edge surfaces of the elements and the greatest longitudinal distance between the inner peripheral edge surfaces of the elements being approximately equal and constituting the maximum longitudinal dimension of the composite packing and each element having an annular portion intermediate its peripheral edge surfaces offset toward the body, so that when one of the rings is moved longitudinally toward the other, the opposing flat walls of the shoulders will initially engage the anti-extrusion elements and force the outer peripheral edge surfaces outwardly and the inner peripheral edge surfaces inwardly into engagement with the two cylindrical surfaces while concomitantly compressing the body of sealing material, forcing it into sealing engagement with the two cylindrical surfaces.

4. The pressure seal of claim 3 in which the anti-extrusion elements are V shaped in cross section and formed of nylon.

References Cited in the file of this patent

UNITED STATES PATENTS

| | | |
|---|---|---|
| 2,148,038 | Raybould | Feb. 21, 1939 |
| 2,444,380 | Shimek | June 29, 1948 |
| 2,459,608 | Wolfram | Jan. 18, 1949 |
| 2,483,845 | Robertson | Oct. 4, 1949 |
| 2,597,976 | Cousins | May 27, 1952 |
| 2,809,080 | Mittell et al. | Oct. 8, 1957 |

FOREIGN PATENTS

| | | |
|---|---|---|
| 1,193,987 | France | May 4, 1959 |